0
2,697,708

2-MERCAPTO-4-HYDROXY-5-PHENOXY PYRIMIDINES AND METHOD OF PREPARING SAME

George H. Hitchings, Tuckahoe, Peter Byrom Russell, Crestwood, and Elvira A. Falco, New Rochelle, N. Y., assignors to Burroughs Wellcome & Co. (U. S. A.) Inc., Tuckahoe, N. Y., a corporation of New York No Drawing. Application January 17, 1952,
Serial No. 267,004

Claims priority, Application Great Britain
February 21, 1951

7 Claims. (Cl. 260—251)

The invention relates to anti-viral compounds showing activity especially against neuro-vaccinia infections and having the formula:

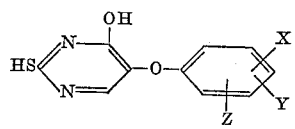

wherein X is a halogen atom, Y is selected from the class consisting of halogen, lower alkyl and hydrogen, and Z is selected from the class consisting of halogen and hydrogen.

Among these substituted 5-phenoxy thiouracils which are active against neuro-vaccinia the preferred compound is 5-(2′,4′-dichlorophenoxy) thiouracil. About 300 mice on being treated with this compound showed a 55% survival in an intracerebral vaccinia infection as compared with an 11% survival by the controls.

These compounds may be prepared by reacting a compound having the general formula:

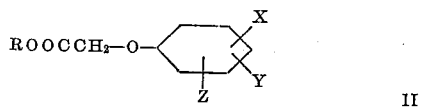

in which R is a lower alkyl group preferably ethyl, and X, Y and Z have the above meanings, with a monocarboxylic alkyl ester, preferably ethyl formate, and thiourea. The reaction takes place in the presence of a condensing agent such as sodium, and it is found that the best yields are obtained when using two molecular proportions of thiourea.

The phenoxy acetates of Formula II may be prepared by reacting a halogeno phenol of the formula

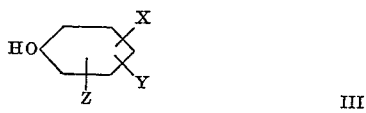

with an alkoxide NaOR and a halogeno acetic ester CH₂XCOOR where R denotes a lower alkyl group, preferably ethyl, and X, Y and Z have the same meanings as above.

The invention is illustrated by the following examples, in which all temperatures are given in degrees centigrade.

EXAMPLE 1

*Preparation of 5-(2′,4′-dichlorophenoxy)-4-hydroxy-2-mercaptopyrimidine*

Into a 4 litre round bottom flask fitted with reflux condenser containing 23 g. (1 mol) of sodium wire and 600 ml. of sodium dried ether is added down the condenser a mixture of 249 g. (1 mol) ethyl 2,4-dichlorophenoxyacetate and 88 ml. (1.1 mol) of ethyl formate. This was added over a period of about eight hours during which time the ether should reflux gently. The flask is held at room temperature overnight at which point all the sodium should have reacted (this may have to be held longer if all sodium is not reacted, the sludge should be mixed to break up lumps and expose any sodium present). When all the sodium has reacted a solution of thiourea, (152 g., 2 mol) in 1600 ml. of warm absolute ethanol is added all at once and the flask placed on the steam bath until all the ether has evaporated. At this point a reflux condenser is placed on the flask and allowed to reflux with occasional stirring for eight hours. (There may be some advantage in mechanical stirring during this condensation). After the reaction has been completed the mixture is poured into 3.5 litres of water, neutralized with acetic acid, and allowed to stand overnight in the ice chest. The precipitate is filtered, washed with about 1 litre of water, and sucked dry. It is then washed with about 500 ml. of ether and then dried in the oven at 110°. Yield, about 180 grams. The solid is then dissolved in boiling glacial acetic acid, treated with carbon and filtered. The acetic acid is evaporated to about ⅓ volume in vacuo (or boiled off at atmospheric pressure) and cooled overnight. The precipitate is filtered off (the filtrate may be evaporated further to obtain more compound) and washed with about 100 ml. of acetic acid and then about 500 ml. of water (95–105 g.).

The compound is then recrystallized by solution in 80% ethanol and cooling in the ice chest overnight, whereupon it crystallized in flat plates. (The filtrate may be evaporated to obtain more compound.) Yield, 75–85 grams of substance melting at 266–267°.

EXAMPLE 2

*Preparation of 5-p-chlorophenoxy-4-hydroxy-2-mercaptopyrimidine*

(A) *Preparation of ethyl chlorophenoxyacetate.*—To one mol of sodium ethoxide (23 g. Na in 500 ml. of ethanol) is added 1 mol of p-chlorophenol (129 g.). When the mixture has cooled to room temperature 167 g. (0.99 mol) of ethyl bromoacetate is added and this is refluxed on the steam bath for five hours. The alcohol is evaporated off in vacuo, the residue poured into 1 litre of water, and extracted with ether. The ether is washed twice with water and dried over sodium sulphate. The ester is obtained by vacuo distillation after evaporation of the ether in the steam bath. Boiling point 153–156°/9 mm.

(B) *Preparation of the pyrimidine.*—This compound has been made in the same manner as the dichlorophenoxypyrimidine above except that only 1 mol of thiourea has been used. The melting point of the compound is 267–268°.

EXAMPLE 3

*Preparation of 5-p-bromophenoxy-4-hydroxy-2-mercaptopyrimidine*

(A) *Ethyl bromophenoxyacetate.*—To 11.5 g. (0.5 mol) of sodium in 400 ml. of absolute ethanol is added 86.5 g. (0.5 mol) p-bromophenol. After this has been cooled to room temperature 83.5 g. (0.5 mol) of ethyl bromoacetate is added and allowed to reflux for five hours. The ester is washed up as the previous one and gave compound which melted at 57–60°.

(B) *Preparation of the pyrimidine.*—The pyrimidine is prepared in the same manner as the dichlorophenoxy derivative above except only 1 mol of thiourea is used. The compound melts at 280–283°.

EXAMPLE 4

*Preparation of 5-(2′,4′-dibromophenoxy)-4-hydroxy-2-mercaptopyrimidine*

(A) *Ethyl 2,4-dibromophenoxyacetate.*—To 9.2 g. (0.4 mol) of sodium in 200 ml. of absolute ethanol is added 101 g. (0.4 mol) of 2,4-dibromophenol. When the mixture has cooled to room temperature 66.8 g. (0.4 mol) of ethyl bromoacetate is added and the reaction mixture refluxed for five hours. The ester is worked up as in previous examples. It melted at 37–41°.

(B) *Preparation of the pyrimidine.*—The dibromophenoxypyrimidine was prepared in the same manner as the chlorophenoxy compound preparations using only 1 mol of thiourea. It melted at 270–273°.

By similar procedure the following compounds are readily prepared:

EXAMPLE 5

5 - o - chlorophenoxy - 4 - hydroxy-2-mercaptopyrimidine, melting point, 268–270°.

EXAMPLE 6

5 - p - iodophenoxy-4-hydroxy-2-mercaptopyrimidine, melting point, 274–275°.

EXAMPLE 7

5-(2',4',5' - trichlorophenoxy)-4-hydroxy-2-mercaptopyrimidine, melting point, 310°.

EXAMPLE 8

5-(3'-methyl-4'-chlorophenoxy)-4-hydroxy - 2 - mercaptopyrimidine, melting point 250–252°.

EXAMPLE 9

5-(2' - chloro-4'-tert. butylphenoxy)-4-hydroxy-2-mercaptopyrimidine, melting point, 206–208°.

These pyrimidines possess only feeble basic characteristics but are moderately weak acids. In practice only salts of alkalis are of interest. These salts may at times be convenient but since the free pyrimidines are the physiologically active substances, we regard all non-toxic salts as the equivalents of the parent compound.

We claim:

1. New compounds of the formula

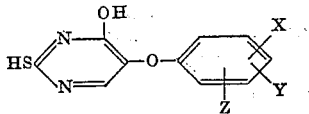

wherein X is a halogen atom, Y is selected from the class consisting of halogen, lower alkyl and hydrogen, and Z is selected from the class consisting of halogen and hydrogen.

2. 5 - (2',4'-dichlorophenoxy)-4-hydroxy-2-mercaptopyrimidine.

3. 5-p-chlorophenoxy-4-hydroxy - 2 - mercaptopyrimidine.

4. 5-p-bromophenoxy-4-hydroxy - 2 - mercaptopyrimidine.

5. 5 - (2',4'-dibromophenoxy)-4-hydroxy-2-mercaptopyrimidine.

6. 5-o-iodophenoxy-4-hydroxy - 2 - mercaptopyrimidine.

7. The method of preparing compounds of the formula

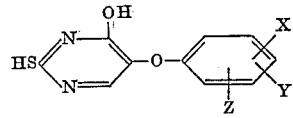

wherein X is a halogen atom, Y is selected from the class consisting of halogen, lower alkyl and hydrogen, and Z is selected from the class consisting of halogen and hydrogen, which comprises reacting a compound having the formula

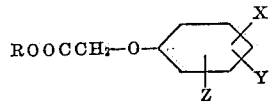

in which R is a lower alkyl group and X, Y and Z have the same meanings, with an alkyl formate in the presence of an alkali metal catalyst and cyclizing the resulting formyl phenoxy acetic ester with thiourea.

No references cited.